(12) United States Patent
Gaudreau, Jr.

(10) Patent No.: US 8,801,097 B2
(45) Date of Patent: Aug. 12, 2014

(54) ANCHOR SYSTEM FOR JUVENILE VEHICLE SEAT

(71) Applicant: Cosco Management, Inc., Wilmington, DE (US)

(72) Inventor: Paul D. Gaudreau, Jr., Indianapolis, IN (US)

(73) Assignee: Cosco Management, Inc., Wilmington, DE (US)

( * ) Notice: Subject to any disclaimer, the term of this patent is extended or adjusted under 35 U.S.C. 154(b) by 100 days.

(21) Appl. No.: 13/622,256

(22) Filed: Sep. 18, 2012

(65) Prior Publication Data

US 2014/0077544 A1    Mar. 20, 2014

(51) Int. Cl.
*B60N 2/26*    (2006.01)
*B60N 2/28*    (2006.01)

(52) U.S. Cl.
USPC .................. 297/256.14; 297/253; 297/256.16

(58) Field of Classification Search
USPC ..................... 297/250.1, 253, 256.14, 256.16
See application file for complete search history.

(56) References Cited

U.S. PATENT DOCUMENTS

| | | | | |
|---|---|---|---|---|
| RE29,841 E | * | 11/1978 | Wener | 297/253 X |
| 4,613,188 A | * | 9/1986 | Tsuge et al. | 297/256.14 X |
| 4,754,999 A | * | 7/1988 | Kain | 297/256.14 |
| 4,768,828 A | * | 9/1988 | Kohketsu | 297/250.1 |
| 5,722,720 A | * | 3/1998 | Lumley | 297/256.14 X |
| 5,842,740 A | * | 12/1998 | Lefranc | 297/250.1 |
| 6,193,310 B1 | * | 2/2001 | Batalaris et al. | 297/253 |
| 6,543,846 B2 | | 4/2003 | Cone | |
| 6,592,183 B2 | * | 7/2003 | Kain | 297/253 |
| 6,863,345 B2 | * | 3/2005 | Kain | 297/256.16 |
| 7,044,548 B2 | | 5/2006 | Mullen et al. | |
| 7,090,294 B2 | * | 8/2006 | Balensiefer et al. | 297/256.14 |
| 7,168,762 B2 | * | 1/2007 | Maciejczyk | 297/253 |
| 7,984,947 B2 | * | 7/2011 | Pos | 297/256.14 X |
| 8,141,950 B2 | * | 3/2012 | Boyer | 297/253 |
| 8,444,222 B2 | * | 5/2013 | Buckingham et al. | 297/253 |
| 2003/0193226 A1 | * | 10/2003 | Kain | 297/253 |
| 2009/0127893 A1 | * | 5/2009 | Brunick et al. | 297/256.14 X |
| 2011/0057489 A1 | * | 3/2011 | Greene | 297/253 |
| 2012/0200131 A1 | * | 8/2012 | Mason et al. | 297/250.1 |
| 2013/0001991 A1 | * | 1/2013 | Hartenstine et al. | 297/250.1 |
| 2013/0001992 A1 | * | 1/2013 | Hartenstine et al. | 297/250.1 |
| 2013/0127218 A1 | * | 5/2013 | Carpenter et al. | 297/253 |
| 2013/0300169 A1 | * | 11/2013 | Lu et al. | 297/250.1 |

* cited by examiner

*Primary Examiner* — Rodney B White
(74) *Attorney, Agent, or Firm* — Barnes & Thornburg LLP

(57) ABSTRACT

A juvenile seat assembly is provided for use with a vehicle seat. The assembly includes a juvenile seat for placement on the vehicle seat and a vehicle anchor system. The vehicle anchor system includes an anchor belt adapted to be coupled to a pair of anchor mounts provided in or near the vehicle seat. The anchor belt includes a strap and connectors coupled to the strap and defining a central portion, the connectors adapted to be coupled to one of the anchor mounts.

33 Claims, 5 Drawing Sheets

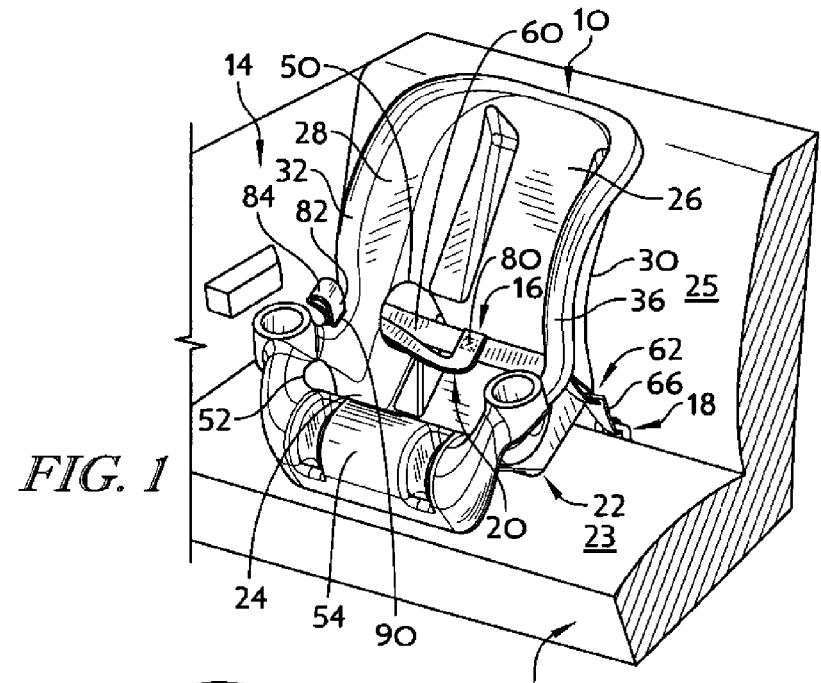
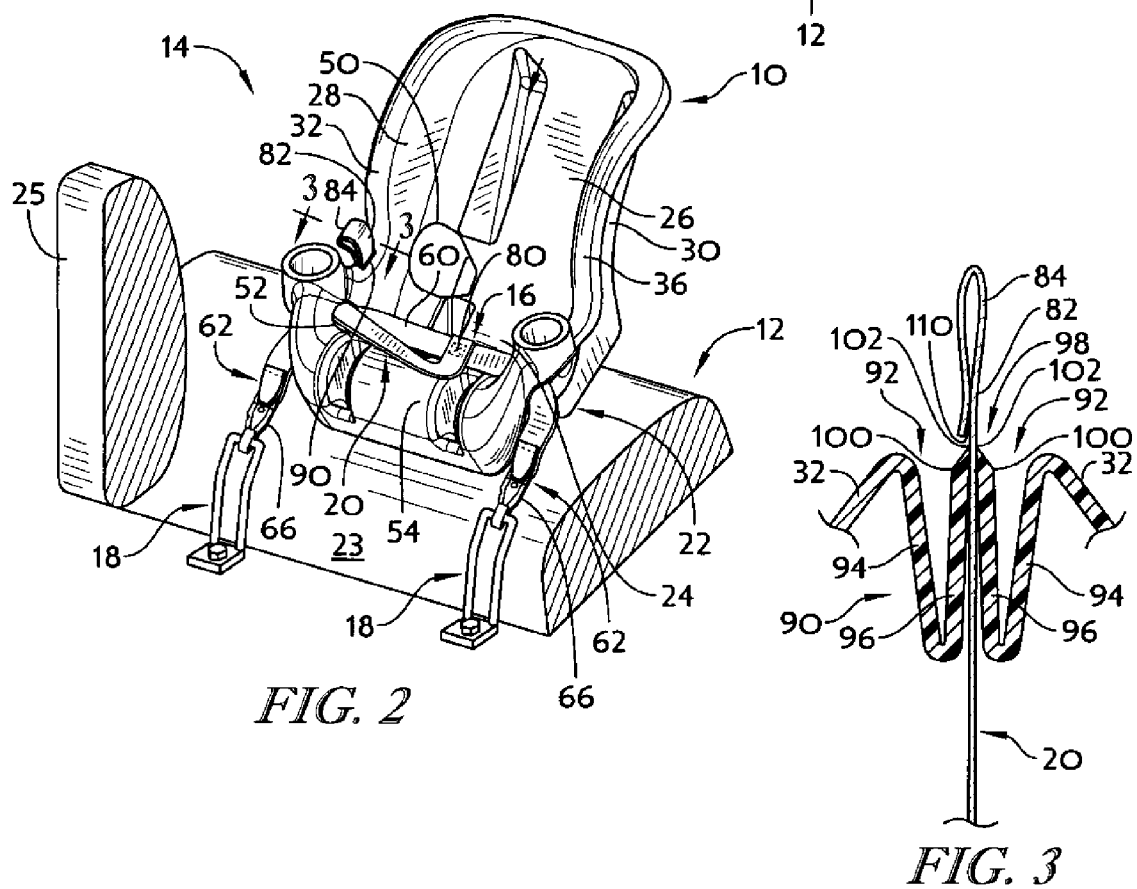
FIG. 1
FIG. 2
FIG. 3

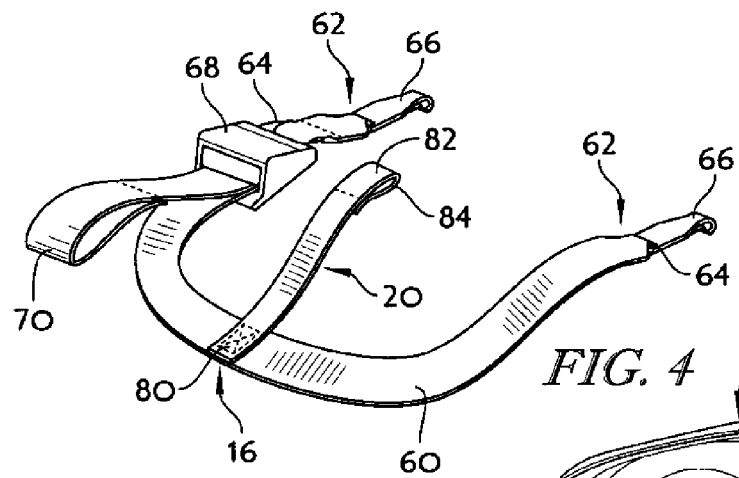
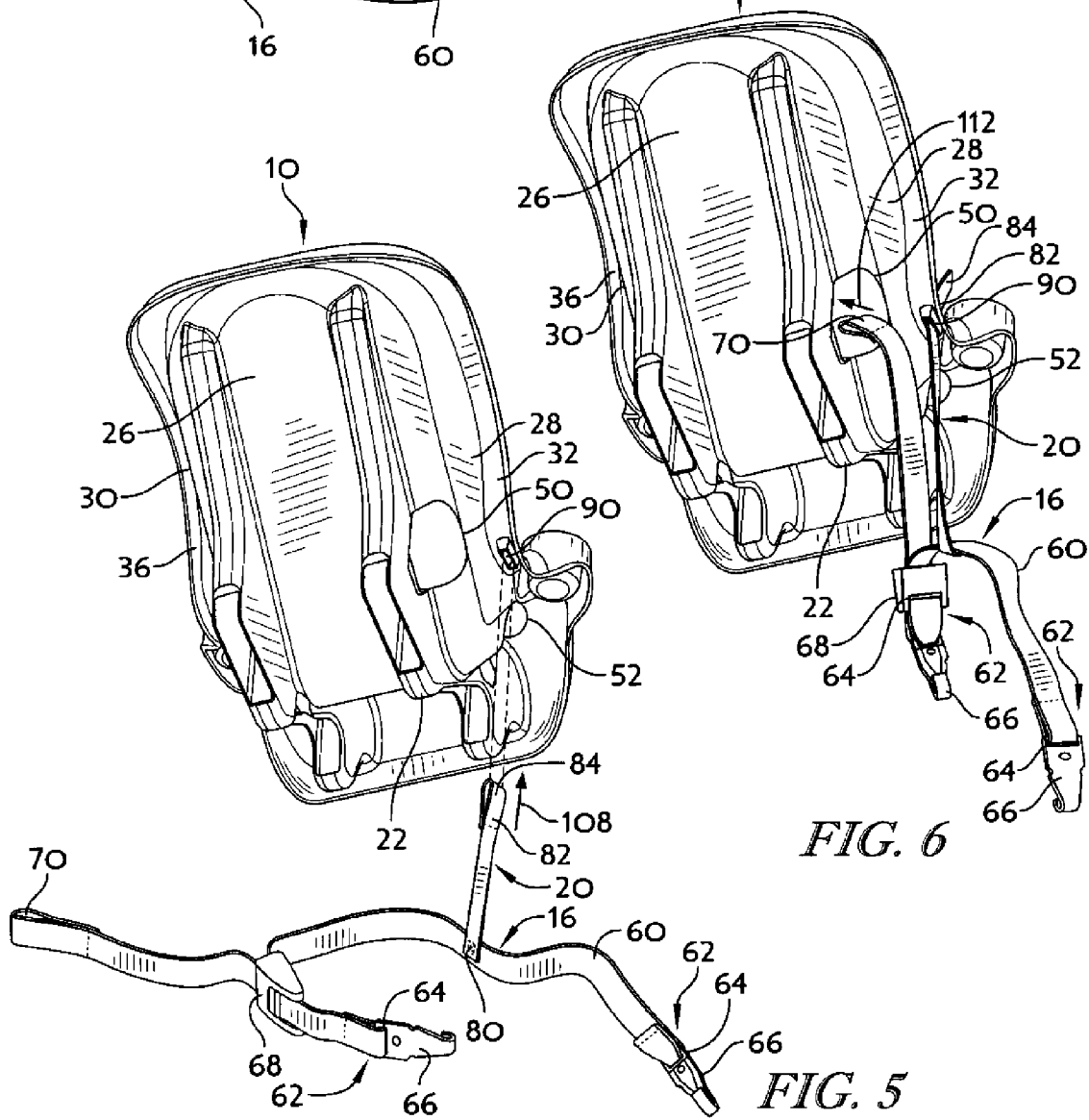
FIG. 4
FIG. 5
FIG. 6

US 8,801,097 B2

ANCHOR SYSTEM FOR JUVENILE VEHICLE SEAT

BACKGROUND

The present disclosure relates to juvenile vehicle seats, and particularly to a juvenile vehicle seat configured to sit in an anchored position on a vehicle seat. More particularly, the present disclosure relates to systems for anchoring juvenile seats in a fixed position on a vehicle seat.

SUMMARY

A juvenile seat assembly in accordance with the present disclosure is provided for use with a vehicle passenger seat and anchor mounts provided in or near the vehicle seat. The seat assembly includes a juvenile seat for placement on the passenger seat and a vehicle anchor system coupled to the juvenile seat. The seat includes a seat bottom, a seat back coupled to the seat bottom, first and second side walls extending from the seat bottom upwardly along opposite edges of the seat back, and first and second rims extending outwardly from the first and second side walls.

In illustrative embodiments, the anchor system includes an anchor belt to be coupled to the anchor mounts provide in or near the vehicle seat and an anchor belt leash coupled to the juvenile seat and the anchor belt. The vehicle anchor system is movable from a first, forwardly facing position on the passenger seat to a second, rearwardly facing position on the passenger seat.

In illustrative embodiments, the juvenile seat includes a pinch having a resilient one-way clamp. A leash is coupled to the central portion of the anchor belt and to the pinch. The leash remains coupled to the pinch when the anchor belt is moved between the first and second positions.

In illustrative embodiments, the juvenile seat includes first and second openings formed in each side wall for receiving the anchor belt therethrough. The anchor belt leash is coupled to a rim of the juvenile seat. The leash includes a thickened area that is retained within a leash pinch provided within the rim of the juvenile seat. In another embodiment, the anchor belt leash is coupled to another portion of the juvenile seat. In an illustrative embodiment, the leash pinch includes a one-way clamp that allows a thickened area of the anchor belt leash to be pushed through the pinch in a first direction, but blocks removal of the anchor belt leash through the pinch in a second direction that is opposite the first direction.

In illustrative embodiments, the anchor belt of the vehicle anchor system includes a strap having opposite ends and a connector coupled near each end of the strap. Each connector is adapted to be coupled to the anchor mounts. The strap further includes a central portion positioned between the connectors and the anchor belt leash is coupled to the central portion of the strap. The anchor belt further includes an adjuster that is used to adjust a length of the central portion of the strap.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a forwardly facing juvenile seat fixed in place on a rear passenger seat bottom in a vehicle by an anchor belt coupled at each end to one of two U-shaped metal anchor mounts bolted to the vehicle floor and arranged to extend upwardly through a space provided between the rear passenger seat bottom and back and showing an anchor belt leash having a front end coupled to the anchor belt and a back end coupled to a leash pinch located within an arm of the juvenile seat;

FIG. 2 is a view similar to FIG. 1 with portions of the passenger seat back removed for clarity, after the juvenile seat has been moved (i.e., turned around) by a user to assume a rearwardly facing position on the rear passenger seat and fixed in place by coupling the anchor belt to the two anchor mounts and further showing the anchor belt leash retained within the leash pinch located within the arm of the juvenile seat;

FIG. 3 is a partial sectional view taken along the line 3-3 of FIG. 1 showing the back end of the anchor belt leash retained within the leash pinch;

FIG. 4 is a perspective view of the anchor belt including a strap having opposing clasps for connecting the strap to the anchor mounts, an adjuster for adjusting a length between the clasps, and a looped end extending beyond the adjuster, and further showing the front end of the anchor belt leash coupled to the strap and the back end having a thickened area;

FIGS. 5-7B depict steps that may be taken to prepare the forwardly facing juvenile seat and anchor belt for attachment to the rear passenger seat bottom, as seen in FIG. 1;

FIG. 5 is a perspective view showing insertion of the thickened area of the leash through the leash pinch within the arm of the juvenile seat;

FIG. 6 is a perspective view showing movement of the looped end of the strap into a rear set of slots;

FIGS. 7A and 7B are a top and rear elevation views of the juvenile car seat after the strap of the anchor belt has been moved through the rear set of slots with the clasps disposed on opposite sides of the juvenile seat and prior to connecting the clasps to the anchor mounts;

FIGS. 8-10B depict steps that may be taken to prepare the rearwardly facing juvenile seat and anchor belt for attachment to the rear passenger seat bottom, as seen in FIG. 2;

FIG. 8 is a perspective view showing insertion of the thickened area of the leash into the leash pinch within the arm of the juvenile seat;

FIG. 9 is a perspective view showing movement of the looped end of the strap through a first of a front set of slots;

FIG. 10 is a perspective view showing movement of the looped end of the strap through a second of the front set of slots.

DETAILED DESCRIPTION

Figure 7A:
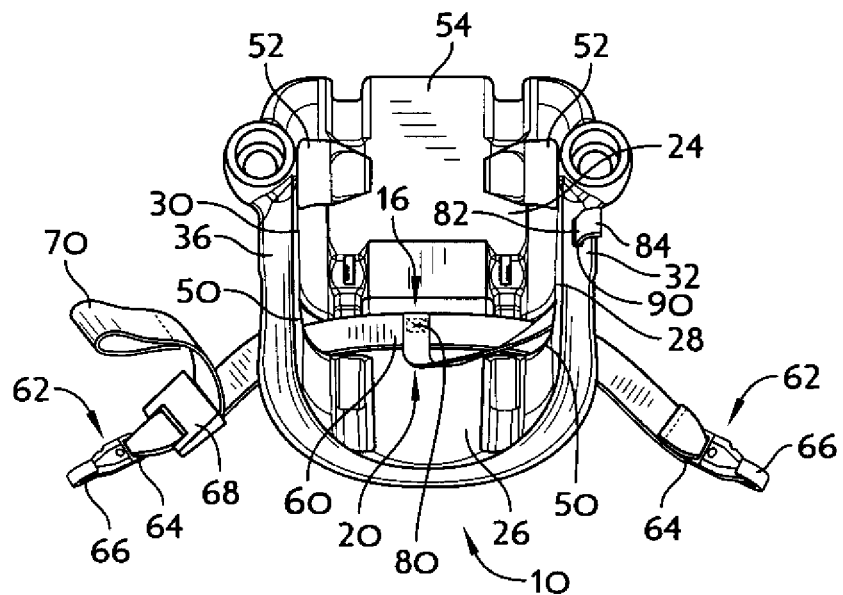

A juvenile seat assembly is provided for use with a vehicle passenger seat. The assembly includes a juvenile seat for placement on the passenger seat and a vehicle anchor system coupled to the juvenile seat. The vehicle anchor system includes an anchor belt to be coupled to a pair of anchor mounts provided in or near the vehicle seat. The vehicle anchor system also includes an anchor belt leash coupled to the juvenile seat and to the anchor belt. The system moves between a first anchored position to anchor the juvenile seat in a forwardly facing position on the passenger seat and a second anchored position to anchor the juvenile seat in a rearwardly facing position on the passenger seat.

In one illustrative embodiment shown in FIGS. 1-11B, juvenile seat is formed to include openings in each side wall for receiving the anchor belt therethrough. The anchor belt leash is coupled to the anchor belt at a first end and to a leash pinch located within an arm of the juvenile seat. The pinch allows a thickened area of the leash to be pushed through the pinch in a first direction, but blocks removal of the leash through the pinch in a second direction that is opposite the first direction.

Referring now to FIGS. 1 and 2, juvenile seat 10 is held in place on a passenger seat 12 in a vehicle 14 by an anchor belt 16 coupled to juvenile seat 10 and to each of two anchor mounts 18 provided in vehicle 14. An anchor belt leash 20 is coupled to anchor belt 16 and to juvenile seat 10. Without separating anchor belt 16 from leash 20, anchor belt 16 can be moved (at the option of a user) relative to juvenile seat 10 between a first anchored position anchoring juvenile seat 10 in forwardly facing position on passenger seat 12 as shown, for example, in FIG. 1 and a second anchored position anchoring juvenile seat 10 in a rearwardly facing position on passenger seat as shown, for example, in FIG. 2.

Leash 20 is adapted for use with convertible juvenile seats such as seat 10, which is adapted to be mounted in either a forwardly facing position or a rearwardly facing position on passenger seat 12. It is within the scope of this disclosure to couple an anchor belt leash 20 to a non-convertible juvenile seat to cause an anchor belt to be coupled permanently to the juvenile seat and readily available to a user.

Juvenile seat 10 includes a base 22 adapted to be set on a bench 23 (or other surface) of passenger seat 12, a seat bottom 24 above base 22, and a seat back 26, as shown in FIGS. 1 and 2. Seat 10 also includes a first side wall 28 extending from seat bottom 24 upwardly along one edge of seat back 26 and a second side wall 30 extending from seat bottom 24 upwardly along an opposite edge of seat bottom 24. Seat 10 further includes a first rim 32 extending outwardly from first side wall 28 and forming a first arm and a second rim 36 extending outwardly from second side wall 30 and forming a second arm. A seat pad (not shown) is mounted on seat 10 to cover portions of the seat bottom 24 and seat back 26. It is within the scope of the present disclosure to provide a shell made of a plastics material and formed to include one or more of seat bottom 24, seat back 26, side walls 28, 30, rims 32, 36 or to provide those components using any suitable structure(s).

Juvenile seat 10 is formed to include forward anchor means for receiving anchor belt 16 in the first anchored position to cause anchor belt 16 to be coupled to juvenile seat 10 when juvenile seat 10 occupies a forwardly facing position on passenger seat 12 as shown in FIG. 1 so that anchor belt 16 can be coupled to anchor mounts 18 to retain juvenile seat 10 in a fixed position on passenger seat bench 23. In an illustrated embodiment, each side wall 28, 30 is formed to include a set of upper or rear openings or slots 50 as shown in FIGS. 1, 2, 5, 6, 7A, and 7B to establish the forward anchor means. It is within the scope of this disclosure to provide one or more belt receivers (in lieu of slots 50) in or on juvenile seat 10 to receive, hold, or restrain anchor belt 16 in its first anchored position.

Juvenile seat 10 is also formed to include rearward anchor means for receiving anchor belt 16 in the second anchored position to cause anchor belt 16 to be coupled to juvenile seat 10 when juvenile seat 10 occupies a rearwardly facing position on passenger seat 12 as shown in FIG. 2 so that anchor belt 16 can be coupled to anchor mounts 18 to retain juvenile seat 10 in a fixed position on passenger seat bench 23. In an illustrated embodiment, each side wall 28, 30 is formed to include a lower or front opening or slot 52 as shown in FIGS. 2, 8-10, 11A, and 11B to establish the rearward anchor means. It is also within the scope of this disclosure to provide one or more belt receivers (in lieu of slots 52) in or on juvenile seat 10 to receive, hold, or restrain anchor belt 16 in its second anchored position.

Figure 7B:
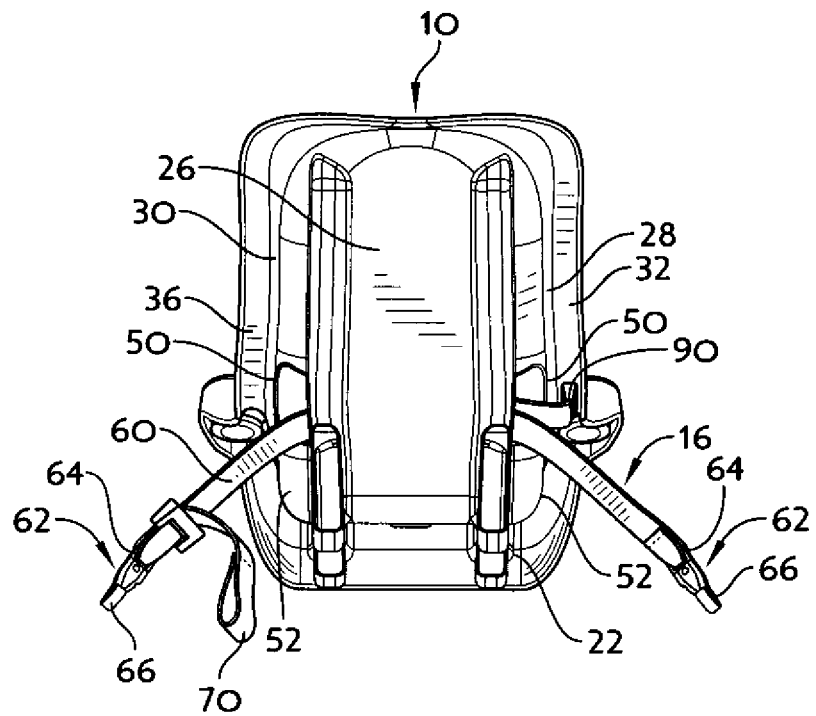

As shown, for example, in FIGS. 7A and 7B, the upper pair of slots 50 are formed to lie on either side of and above seat bottom 24 and below rims 32, 36. The lower pair of slots 52 is formed to lie on either side of a front 54 of seat back 26 and above seat bottom 24. Each of slots 50, 52 has an oblong or rectangular border and is sized to permit a portion of anchor belt 16 to be passed or threaded therethrough.

Anchor mounts 18 are provided by the manufacturer of vehicle 14 or other aftermarket supplier and can take any suitable form. In the illustrated embodiment, each anchor mount includes an elongated U-shaped rod and a base coupled to the rod and fixed to a floor or other part of vehicle 14. A bight portion of the U-shaped rod is arranged to extend upwardly through a space provided between a rear end of passenger seat bench 23 and a lower portion of passenger seat back 25 included in vehicle seat 12. Anchor mounts 18 are aligned in spaced-apart relation to one another so that anchor belt 16 can be coupled to juvenile seat 10 and to each anchor mount whether anchor belt 16 is received in its first anchored position or its second anchored position on passenger seat 12.

Anchor belt 16, as seen in FIG. 4, includes a strap 60 having opposite ends and a clasp 62 or other suitable connector on or near each end of strap 60. Each clasp 62 is configured to be coupled to one of anchor mounts 18 as shown, for example, in FIGS. 1 and 2. Each clasp 62 includes a slot 64 for receiving strap 60 therethrough and a hook 66 adapted to couple with one of the anchor mounts 18. Strap 60 is made of any suitable seat belt or harness restraint material. Anchor belt 16 further includes an adjuster 68 used to adjust a length of a central portion of strap 60 positioned between clasps 62. Anchor belt 16 may include a looped end 70 extending beyond adjuster 68 for guiding anchor belt 16.

Anchor belt leash 20 is coupled to the central portion of strap 60 at one end 80 and to first rim 32 at an opposite end 82 as shown, for example, in FIGS. 1 and 2. Opposite end 82 of anchor belt leash 20 is sewn or otherwise attached to itself to form a thickened area 84. It is also within the scope of this disclosure to form thickened area 84 in other manner, such as by attachment of a separate piece of material, or any other manner that would allow thickened area 84 to be retained, as discussed below. Anchor belt 16 can be moved between its first and second anchored positions without separating anchor belt 16 from leash 20, as suggested in FIGS. 6 and 9.

Opposite end 82 of anchor belt leash 20 is coupled to first rim 32 extending from first side wall 28 as shown, for example, in FIGS. 1, 2, 5-12B. It is within the scope of this disclosure to couple the anchor belt leash 20 to other portions of juvenile seat 10, for example, second rim 36 extending outwardly from second side wall 30.

Referring to FIG. 3, a leash pinch 90 is formed within first rim 32 to fixedly connect opposite end 82 of anchor belt leash 20 to juvenile seat 10. Leash pinch 90 includes a clamp formed by two opposing resilient clamp members 92 extending below first rim 32. Each clamp member 92 includes a downwardly extending angled wall 94 and an upwardly extending angled wall 96 extending from each wall 94. An opening 98 is formed between free ends 100 of upwardly extending angled walls 96. Free ends 100 are angled downwardly and outwardly to provide inner pointed edges 102 for capturing thickened area 84 therebetween. It is within the scope of the present disclosure to mold leash pinch 90 with juvenile seat 10 to form a single piece or to form first rim 32 with an aperture for attachment of leash pinch 90.

Referring to FIGS. 5-7B, to establish the first anchored position of anchor belt 16 as shown in FIG. 1, a user passes thickened area 84 of anchor belt leash 20 in a first direction 108 through opening 98 formed between clamp members 92 of leash pinch 90. As thickened area 84 is moved between clamp members 92, angled walls 94, 96 move outwardly to accommodate thickened area 84. Once thickened area 84 has passed through clamp members 92 and is disposed above first rim 32 as shown, for example, in FIG. 3, clamp members 92 return to their original positions and a notch 110 in thickened area 84 prevents removal of thickened area 84 through leash pinch 90 in a second direction opposite first direction 108.

Once opposite end 82 of anchor belt leash 20 is coupled to leash pinch 90, anchor belt 16 is threaded through upper slots 50, for example, by inserting looped end 70 through upper slot 50 formed in side wall 28, as shown by arrow 112 in FIG. 6, and then through upper slot 50 formed in sidewall 30. It is within the scope of this disclosure for a user to thread one of the clasps 62 through upper slots 50. Referring to FIGS. 7A and 7B, when anchor belt 16 is positioned with clasps 62 on opposing sides of juvenile seat 10 and anchor belt leash 20 positioned centrally within juvenile seat 10, each clasp 62 may be coupled to one of anchor mounts 18. After installation as shown in FIG. 1, adjuster 68 may be used to adjust a length of central portion of strap 60 positioned between clasps 62.

During use of juvenile seat 16, anchor belt leash 20 lies under a removable seat pad (not shown) covering seat bottom 20 and other portions of juvenile seat 10. Removing a portion of seat pad exposes anchor belt 16 so that anchor belt 16 can be moved between its first and second anchored positions.

Figure 8:
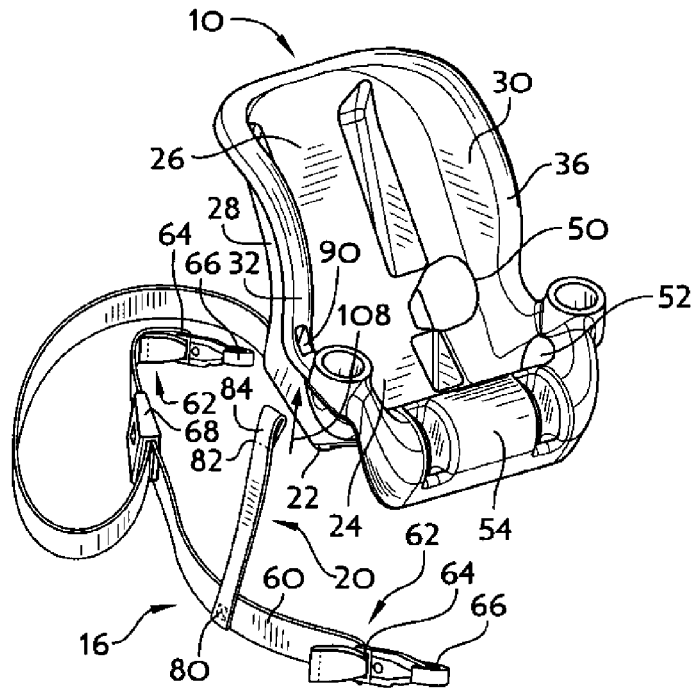
Figure 9:
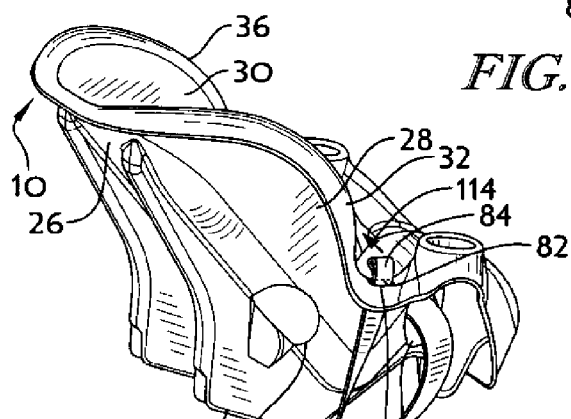

Referring to FIGS. 8-11B, to establish the second anchored position of anchor belt 16 as shown in FIG. 2, a user positions thickened area 84 of opposite end 82 of anchor belt leash 20 within leash pinch 90, as shown in FIGS. 8 and 9, in the same manner as discussed above with respect to FIGS. 5-7B.

Figure 10:
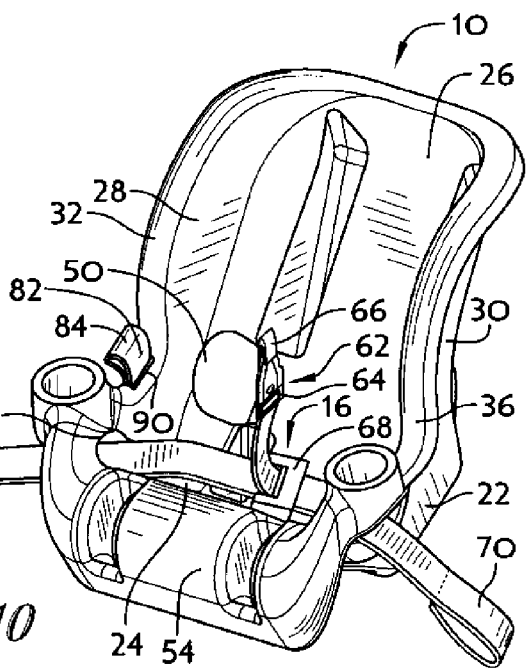
Figure 11A:
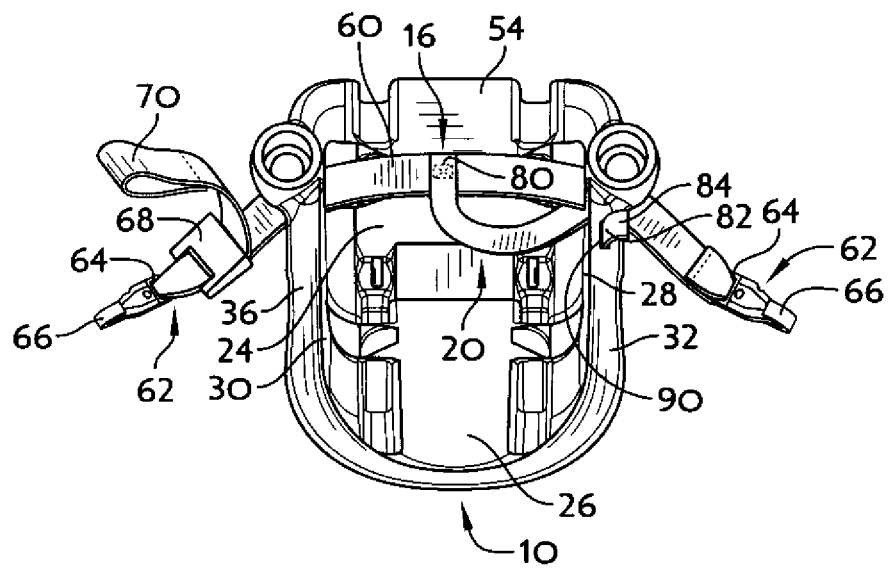
FIGS. 11A and 11B are top and front elevation views of the juvenile car seat after the strap of the anchor belt has been moved through the front set of slots with the clasps disposed on opposite sides of the juvenile seat and prior to connecting the clasps to the anchor mounts.
Figure 11B:
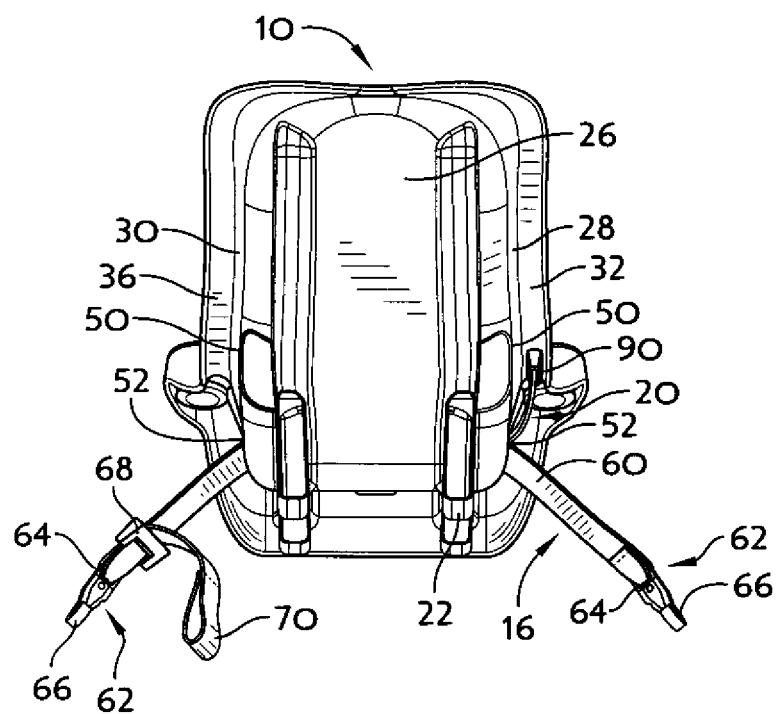

Once opposite end 82 of anchor belt leash 20 is coupled to leash pinch 90, anchor belt 16 is threaded through lower slots 52, for example, by inserting looped end 70 through lower slot 52 formed in side wall 28, as shown by arrow 114 in FIG. 9, and then through lower slot 52 formed in sidewall 30, as seen in FIG. 10. It is within the scope of this disclosure for a user to thread one of the clasps 62 through lower slots 52. Referring to FIGS. 11A and 11B, when anchor belt 16 is positioned with clasps 62 on opposing sides of juvenile seat 10 and anchor belt leash 20 is positioned centrally within juvenile seat 10, each clasp 62 may be coupled to one of anchor mounts 18. After installation as shown in FIG. 2, adjuster 68 may be used to adjust a length of central portion of strap 60 positioned between clasps 62.

It is also within the scope of this disclosure for anchor belt 16 to be attached to juvenile seat 10 during manufacture of juvenile seat 10, in which case, a user would begin by threading anchor belt 16 through either upper slots 50 or upper slots 52.

Once anchor belt leash 20 has been secured within leash pinch 90 and anchor belt 16 has been positioned in either of the first and second anchored positions, a user may re-position anchor belt 16. To re-position from the first anchored position to the second anchored position, a user pulls anchor belt 16 out through upper slot 50 in side wall 30 and through upper slot 50 in side wall 28 and re-positions anchor belt 16 within lower slots 52, as described above with respect to FIGS. 8-11B. Similarly, to re-position from the second anchored position to the first anchored position, a user pulls anchor belt 16 out through lower slot 52 in side wall 30 and through lower slot 52 in side wall 28 and re-positions anchor belt 16 within upper slots 50, as described above with respect to FIGS. 5-7B.

The invention claimed is:

1. A juvenile seat assembly for use with a vehicle seat and anchor mounts provided near the vehicle seat, the assembly comprising
    a juvenile seat being made of a plastic material and having a first pair of openings and a second pair of openings,
    an anchor belt including a strap and connectors coupled to the strap and defining a central portion, the connectors adapted to be coupled to one of the anchor mounts, the anchor belt being threaded through the first openings when the seat is mounted in a first, forwardly facing position and the anchor belt being threaded through the second openings when the seat is mounted in a second, rearwardly facing position,
    a pinch formed in the juvenile seat to provide a resilient one-way clamp, and
    a leash coupled to the central portion of the anchor belt and to the pinch, the leash remaining coupled to the pinch when the anchor belt is moved between the first and second positions.

2. A juvenile seat assembly for use with a vehicle seat and anchor mounts provided near the vehicle seat, the assembly comprising
    a juvenile seat having a first pair of openings and a second pair of openings, the seat being adapted for mounting on a vehicle seat in a first, forwardly facing position and a second, rearwardly facing position,
    an anchor belt including a strap and connectors coupled to the strap and defining a central portion, the connectors adapted to be coupled to one of the anchor mounts, the anchor belt being threaded through the first openings when the seat is mounted in the first, forwardly facing position and the anchor belt being threaded through the second openings when the seat is mounted in the second, rearwardly facing position,
    a pinch disposed within a portion of the juvenile seat and including a resilient one-way clamp,
    a leash coupled to the central portion of the anchor belt and to the pinch, the leash remaining coupled to the pinch when the anchor belt is moved between the first and second positions, and
    wherein the juvenile seat includes a seat bottom, a seat back extending upwardly from the seat bottom, a first side wall extending from the seat bottom upwardly along one edge of the seat back, a second side wall extending from the seat bottom upwardly along an opposite edge of the seat back, a first rim extending outwardly from the first side wall and forming a first arm and a second rim extending outwardly from the second side wall and forming a second arm, and the pinch is formed integrally within the first arm.

3. A juvenile seat assembly for use with a vehicle seat and anchor mounts provided near the vehicle seat, the assembly comprising
    a juvenile seat having a first pair of openings and a second pair of openings, the seat being adapted for mounting on a vehicle seat in a first, forwardly facing position and a second, rearwardly facing position,
    an anchor belt including a strap and connectors coupled to the strap and defining a central portion, the connectors adapted to be coupled to one of the anchor mounts, the anchor belt being threaded through the first openings when the seat is mounted in the first, forwardly facing position and the anchor belt being threaded through the second openings when the seat is mounted in the second, rearwardly facing position, a pinch disposed within a portion of the juvenile seat and including a resilient one-way clamp, a leash coupled to the central portion of the anchor belt and to the pinch, the leash remaining coupled to the pinch when the anchor belt is moved between the first and second positions, and wherein the juvenile seat includes a seat bottom, a seat back extending upwardly from the seat bottom, a first side wall extending from the seat bottom upwardly along one edge of the seat back, and a second side wall extending from the seat bottom upwardly along an opposite edge of the seat back, a first rim extending outwardly from the first side wall and forming a first arm and a second rim extending outwardly from the second side wall and forming a second arm, and the pinch is formed within the first arm and includes two opposing resilient clamp members that allow movement of the leash in a first direction through the pinch, but prevent movement of the leash in a second direction through the pinch, wherein the second direction is opposite the first direction.

4. A juvenile seat assembly for use with a vehicle seat and anchor mounts provided near the vehicle seat, the assembly comprising a juvenile seat having a first pair of openings and a second pair of openings, the seat being adapted for mounting on a vehicle seat in a first, forwardly facing position and a second, rearwardly facing position, an anchor belt including a strap and connectors coupled to the strap and defining a central portion, the connectors adapted to be coupled to one of the anchor mounts, the anchor belt being threaded through the first openings when the seat is mounted in the first, forwardly facing position and the anchor belt being threaded through the second openings when the seat is mounted in the second, rearwardly facing position, a pinch disposed within a portion of the juvenile seat and including a resilient one-way clamp, a leash coupled to the central portion of the anchor belt and to the pinch, the leash remaining coupled to the pinch when the anchor belt is moved between the first and second positions, and wherein the one-way clamp of the pinch includes two opposing resilient clamp members each formed of a first angled wall extending downwardly from a first rim included in the juvenile seat and a second angled wall extending upwardly from the first angled wall.

5. The assembly of claim 4, wherein the pinch further includes an opening formed between free ends of the second angled walls.

6. The assembly of claim 5, wherein free ends of the second angled walls are angled downwardly and outwardly to form inner pointed edges that retain a thickened area of the leash therebetween.

7. The assembly of claim 4, wherein the first and second angled walls of each clamp member are biased inwardly toward the first and second angled walls of the other clamp member to create the clamp.

8. The assembly of claim 7, wherein movement of a thickened area of the leash through the pinch moves each clamp member outwardly and, after movement of the thickened area through the pinch, the clamp members return to their inwardly biased position.

9. The assembly of claim 1, wherein the leash is connected at a first end to the central portion of the anchor belt and at a second end to the pinch.

10. The assembly of claim 9, wherein the second end of the leash is folded over and attached to itself to form a thickened area in the form of a looped end.

11. A juvenile seat assembly for use with a vehicle seat and anchor mounts provided near the vehicle seat, the assembly comprising a juvenile seat having a first pair of openings and a second pair of openings, the seat being adapted for mounting on a vehicle seat in a first, forwardly facing position and a second, rearwardly facing position, an anchor belt including a strap and connectors coupled to the strap and defining a central portion, the connectors adapted to be coupled to one of the anchor mounts, the anchor belt being threaded through the first openings when the seat is mounted in the first, forwardly facing position and the anchor belt being threaded through the second openings when the seat is mounted in the second, forwardly facing position, a pinch disposed within a portion of the juvenile seat and including a resilient one-way clamp, a leash coupled to the central portion of the anchor belt and to the pinch, the leash remaining coupled to the pinch when the anchor belt is moved between the first and second positions, wherein the leash is connected at a first end to the central portion of the anchor belt and at a second end to the pinch, wherein the looped end forms a notch that interacts with the pinch to retain the second end of the leash within the pinch, and wherein the second end of the leash is folded over and attached to itself to form a thickened area in the form of a looped end.

12. A juvenile seat assembly for use with a vehicle seat and anchor mounts provided near the vehicle seat, the assembly comprising a juvenile seat made of plastics material and formed to include a pinch configured to define a resilient one-way clamp, and a vehicle anchor system including an anchor belt adapted to be coupled to the anchor mounts and a leash coupled to the pinch formed in the juvenile seat and the anchor belt.

13. The assembly of claim 12, wherein the system is positionable in either a first anchored position to anchor the juvenile seat in a rearwardly facing position on the passenger seat or a second anchored position to anchor the juvenile seat in a forwardly facing position on the passenger seat, the first and second positions being distinct from one another.

14. The assembly of claim 13, wherein the leash remains coupled to the juvenile seat and to the anchor belt when the system is moved between the first and second anchored positions.

15. The assembly of claim 12, wherein the anchor belt includes a strap having opposite ends and a connector coupled near each end of the strap and adapted to be coupled to the anchor mounts.

16. The assembly of claim 15, wherein the strap includes a central portion positioned between each connector and the leash is coupled to the central portion of the strap.

17. The assembly of claim 16, wherein the anchor belt includes an adjuster used to adjust a length of the central portion of the strap extending between each connector.

18. A juvenile seat assembly for use with a vehicle seat and anchor mounts provided near the vehicle seat, the assembly comprising
a juvenile seat,
a pinch disposed within a portion of the juvenile seat and including a resilient one-way clamp, and
a vehicle anchor system including an anchor belt adapted to be coupled to the anchor mounts and a leash coupled to the anchor belt and the pinch,
wherein the anchor belt includes a strap having opposite ends and a connector coupled near each end of the strap and adapted to be coupled to the anchor mounts,
wherein the strap includes a central portion positioned between each connector and the leash is coupled to the central portion of the strap,
wherein the anchor belt includes an adjuster used to adjust a length of the central portion of the strap extending between each connector, and
wherein the strap extends beyond the adjuster to form a looped end for guiding the anchor belt.

19. The assembly of claim 15, wherein each connector includes a slot for receiving the strap therethrough and a hook adapted to couple with one of the anchor mounts.

20. A juvenile seat assembly for use with a vehicle seat and anchor mounts provided near the vehicle seat, the assembly comprising
a juvenile seat,
a pinch disposed within a portion of the juvenile seat and including a resilient one-way clamp, and
a vehicle anchor system including an anchor belt adapted to be coupled to the anchor mounts and a leash coupled to the anchor belt and the pinch, and
wherein the juvenile seat includes a seat bottom, a seat back extending upwardly from the seat bottom, a first side wall extending from the seat bottom upwardly along one edge of the seat back, a second side wall extending from the seat bottom upwardly along an opposite edge of the seat back, a first rim extending outwardly from the first side wall and forming a first arm and a second rim extending outwardly from the second side wall and forming a second arm, and the pinch is formed integrally within the first arm.

21. A juvenile seat assembly for use with a vehicle seat and anchor mounts provided near the vehicle seat, the assembly comprising
a juvenile seat,
a pinch disposed within a portion of the juvenile seat and including a resilient one-way clamp, and
a vehicle anchor system including an anchor belt adapted to be coupled to the anchor mounts and a leash coupled to the anchor belt and the pinch, and
wherein the juvenile seat includes a seat bottom, a seat back extending upwardly from the seat bottom, a first side wall extending from the seat bottom upwardly along one edge of the seat back, a second side wall extending from the seat bottom upwardly along an opposite edge of the seat back, a first rim extending outwardly from the first side wall and forming a first arm and a second rim extending outwardly from the second side wall and forming a second arm, and wherein the one-way clamp of the pinch includes two opposing resilient clamp members each formed of a first angled wall extending downwardly from the first rim and a second angled wall extending upwardly from the first angled wall.

22. The assembly of claim 21, wherein the pinch further includes an opening formed between free ends of the second angled walls.

23. The assembly of claim 22, wherein free ends of the second angled walls are angled downwardly and outwardly to provide inner pointed edges that retain a thickened area of the leash therebetween.

24. The assembly of claim 21, wherein the first and second angled walls of each clamp member are biased inwardly toward the first and second angled walls of the other clamp member to create the clamp.

25. The assembly of claim 24, wherein movement of a thickened area of the leash through the pinch moves each clamp member outwardly and, after movement of the thickened area through the pinch, the clamp members return to their inwardly biased position.

26. A juvenile vehicle seat comprising
a seat-anchor system including an anchor belt adapted to mate with an anchor mount provided in a vehicle seat and a leash coupled to the anchor belt and formed to include a free end having a thickened area, and
a seat made of a plastics material and formed to include pinch means for defining a leash-receiving opening and a one-way clamp associated with the leash-receiving opening to allow movement of the thickened area of the free end of the leash in a first direction through the leash-receiving opening to reach a retained position coupled to the seat without allowing the thickened area of the free end of the leash to pass back through the leash-receiving opening in an opposite second direction.

27. The juvenile vehicle seat of claim 26, wherein the seat includes a seat bottom, a seat back extending upwardly from the seat bottom, and a rim arranged to lie alongside the seat bottom and back and formed to include the pinch means.

28. The juvenile vehicle seat of claim 27, wherein the thickened area of the free end of the leash is arranged to lie above the rim when the leash is arranged to extend through the leash-receiving opening defined by the pinch means so that a proximal portion of the leash coupled to the anchor belt is arranged to lie alongside the seat back when the anchor belt passes through openings formed in the seat back to anchor the seat in a forward-facing mode on a passenger seat of a vehicle.

29. The juvenile vehicle seat of claim 27, wherein the thickened area of the free end of the leash is arranged to lie above the rim when the leash is arranged to extend through the leash-receiving opening defined by the pinch means so that a proximal portion of the leash coupled to the anchor belt is arranged to lie alongside the seat bottom when the anchor belt passes through openings formed in the seat bottom to anchor the seat in a rearward-facing mode on a passenger seat of a vehicle.

30. The juvenile vehicle seat of claim 26, wherein the one-way clamp defined by the pinch means includes first and second opposing resilient clamp members coupled to the rim to form a monolithic component and define the leash-receiving opening therebetween.

31. The juvenile vehicle seat of claim 30, wherein each clamp member includes a downwardly extending angled wall coupled to the rim and an upwardly extending angled wall coupled to the downwardly extending angled wall to cooperate with the companion downwardly extending angled wall to form an elastic V-shaped member and the upwardly extending angled walls cooperate to form the leash-receiving opening therebetween.

32. The juvenile vehicle seat of claim 31, wherein the thickened area of the free end of the leash is arranged to lie alongside free ends of the upwardly extending angled walls of the clamp members when the leash is arranged to extend through the leash-receiving opening and the free ends of the upwardly extending angled walls are arranged to lie in close proximity to one another to block movement of the thickened area of the free end of the leash in the opposite second direction through the leash-receiving opening.

33. The juvenile vehicle seat of claim 32, wherein one of the free ends of the upwardly extending angular walls are formed to include an inner pointed edge to provide means for capturing a notch formed in the thickened area of the free end of the leash during movement of the leash in the opposite second direction.

* * * * *